Sept. 15, 1953  M. E. ESTEY  2,652,298
PISTON SEALING RING
Filed June 4, 1951
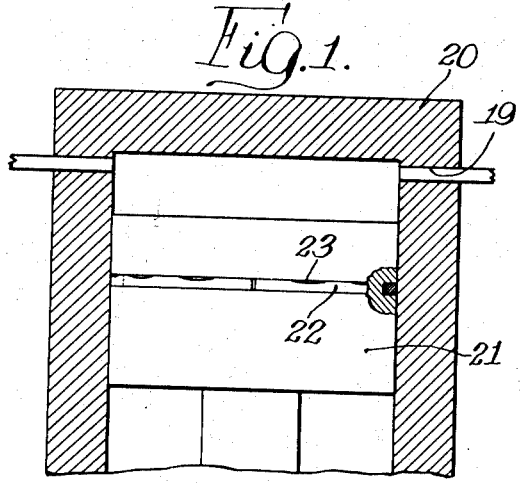
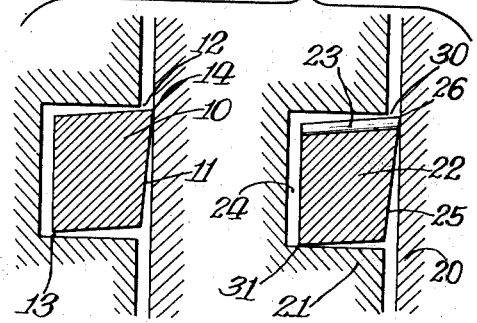
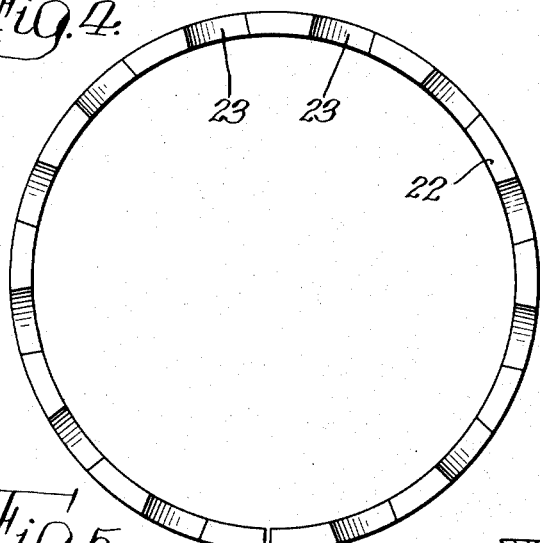
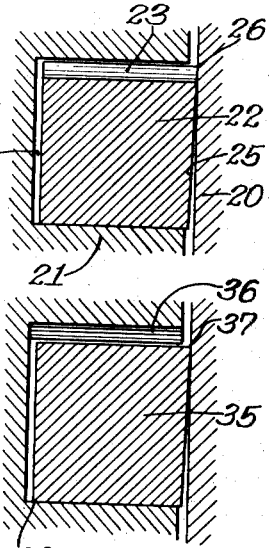
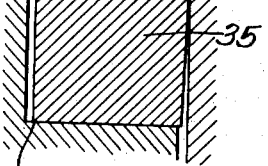
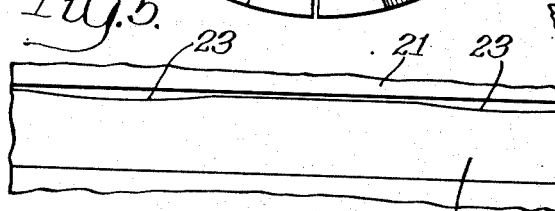
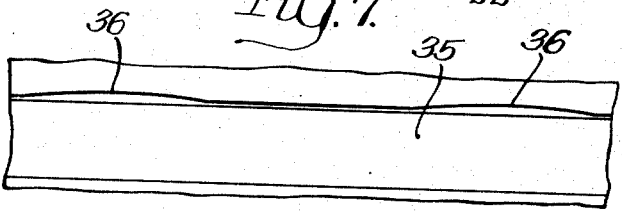
INVENTOR.
Melvin E. Estey,
BY
Davis, Lindsey, Hibben + Noyes
Atty's.

Patented Sept. 15, 1953

2,652,298

UNITED STATES PATENT OFFICE 2,652,298

PISTON SEALING RING

Melvin E. Estey, Hagerstown, Ind., assignor to Perfect Circle Corporation, Hagerstown, Ind., a corporation of Indiana Application June 4, 1951, Serial No. 229,791

8 Claims. (Cl. 309—44)

The invention relates generally to piston rings and more particularly to a sealing ring for use on a piston adapted to sustain a fluid pressure.

The general object of the invention is to provide a novel piston and sealing ring construction which is adapted to sustain a fluid pressure differential at one side of the piston with a minimum of leakage of fluid past the piston.

Another object is to provide a novel piston and sealing ring construction in which the pressure of the fluid acts on the sealing ring to cause it to provide a highly effective seal.

A further object is to provide a novel piston and sealing ring construction in which the sealing ring has a highly effective sealing engagement with the wall of the cylinder and with the groove in the piston due to the action of the pressure of the fluid on the ring and is freely expansible and contractible in the groove.

Still another object is to provide a novel ring construction adapted to cooperate with a piston to attain the foregoing objects.

Other objects and advantages will become apparent from the following description taken in connection with the accompanying drawing, in which:

Fig. 1 is a diagrammatic view of a cylinder having a piston therein provided with a piston ring, the piston and ring embodying the features of the invention.

Fig. 2 comprises two diagrammatic cross-sectional views on an enlarged scale, one illustrating the action of an ordinary taper face piston ring, and the other illustrating a ring made according to the invention.

Fig. 3 is a cross-sectional view of a ring and a fragmentary portion of a piston and illustrating one embodiment of the invention.

Fig. 4 is a plan view of the ring shown in Fig. 3.

Fig. 5 is a fragmentary side elevational view of a piston and ring according to Fig. 3.

Fig. 6 is a crosss-sectional view similar to Fig. 3, but illustrating another embodiment of the invention.

Fig. 7 is a fragmentary side elevational view of a piston and ring according to Fig. 6.

Fig. 8 is a view similar to Figs. 3 and 6 but showing still another embodiment of the invention.

In numerous types of fluid pressure systems, a piston and cylinder may be employed where relatively large pressure differentials between opposite sides of the piston occur and it is desirable to provide a highly effective seal to prevent leakage past the piston. The piston, of course, must be able to be operated easily so that tight flexible packings are impractical for such use because of the friction resisting free movement of the piston. For this reason a metallic piston ring is utilized to provide the seal between the piston and the cylinder, but ordinary piston rings will not function as an effective seal under these circumstances.

One instance where such a piston and cylinder device is frequently employed is as an accumulator in a hydraulic system where pressures on the order of 1,000 pounds per square inch are frequently employed. In such an instance, the pressure differential acting on the piston and its associated ring means is large and the structure should be such that a relatively small amount of hydraulic fluid is permitted to leak past the piston so that the pressures will be effective to perform the necessary functions in the hydraulic system. While the present invention is adapted for use in accumulators of this type, it is not limited to this particular use, but may be used in any piston where a highly effective seal is desired against leakage past the piston, whether the fluid involved is the ordinary hydraulic fluid or whether it be some other liquid or a gas.

In a piston and cylinder device of this general character, the piston has some clearance within the cylinder and is provided with a peripheral groove in which the ring is placed. The ring is of a type which extends into tight contact with the cylinder wall and must effect not only a tight seal with the wall of the cylinder, but also must provide a pressure sustaining seal with a portion of the ring groove in the piston so that the pressure fluid cannot leak around the ring through the groove.

It has been found that the most effective seal against the cylinder wall can be attained by means of a taper face ring placed so that the scraping edge of the ring is toward the high pressure side. If such a ring were installed up-side-down, there would be an entering wedge of fluid between the taper face of the ring and the cylinder wall which would tend to collapse the ring radially inward and thus allow the escape of fluid between the ring and the cylinder wall. However, with the scraping edge of the ring toward the pressure side, the self-expansible character of the ring is sufficient to hold it in tight engagement with the cylinder wall and no forces exist which would tend to collapse the ring.

The other phase of the sealing problem is to prevent passage of the pressure fluid around behind the ring through the ring groove. When a taper face ring is confined within a cylinder with its scraping edge toward the high pressure side, it tends to twist or dish slightly toward the low pressure side at its inner periphery because of the expansive force exerted by the ring, since the ring contacts the cylinder only along its scraping edge at the high pressure side. This twist or dishing action tends to reduce the taper on the face of the ring relative to the cylinder so that the angle of taper must be greater than the angle resulting from the dishing. If, in this dishing action, the edge formed by the low pressure side of the ring and its inner periphery seats against the adjacent side of the groove, then a good fluid seal is accomplished. However, with an ordinary taper face ring, which is generally rectangular in cross-section except for the outer taper face, such seating of the above-mentioned edge is not always accomplished.

If the ring seats in this manner immediately when pressure is applied, then the ring will act properly as a seal. However, such a seal is frequently not obtained, due to the pressure and fluid velocity conditions at the sides of the ring. To explain this more fully, it may be pointed out that when the pressure fluid flows past the ring on both sides thereof and in the space at the back of the groove inside of the ring, the narrow passage between each side of the ring and the adjacent side of the groove causes an increase in velocity of the fluid with a decrease in pressure at that point. With the ordinary ring, there is a tendency for the fluid velocities on both sides of the ring to equalize, and when there is such equality of velocity, the ring tends to be held in the center of the groove axially so that there is no effective seal against either side of the groove. Thus, fluid continues to leak past the ring around the inner side thereof, and although an effective seal is provided between the ring and the piston wall, the leakage around the ring within the groove is sufficient to render the ring ineffective as a positive seal. A certain freedom of movement between the ring and the groove must be maintained in order that the ring may expand and contract in order to follow any variations in contour of the cylinder wall.

A piston and its associated ring embodying the features of the invention is so constructed that a balance of pressure or velocities on the two sides of the ring will not be obtained, and with the higher pressure acting on the upper or high pressure side of the ring, a definite seal along the edge defined by the low pressure side of the ring and the inner periphery will always be obtained. To effect such an unbalance in pressure on the sides of the ring, either the ring itself or the piston may be provided with passages adapted to conduct fluid pressure from the high pressure side of the inner portion of the groove. The ring has a taper face as in the usual taper face type of ring, but by conducting fluid pressure to the inside of the groove, the velocity of fluid flowing at the high pressure side is greatly reduced with the consequent maintenance of high pressure over substantially the entire area of the side. At the other side of the ring, if there is any leakage, the velocity of the fluid flowing thereby is increased because of the small size of the space with a consequent reduction of pressure at that point. Thus, the two sides of the ring are unbalanced as to pressure and the differential is effective to force the ring toward the low pressure side of the groove so that with the dishing of the ring, the edge defined by the low pressure side and the inner periphery will form an effective seal with the adjacent side of the groove.

In the left-hand view shown in Fig. 2, I have illustrated an ordinary taper face ring 10, the taper face being indicated at 11. As illustrated in this view, it will be noted that the space indicated at 12 between the high pressure side of the ring and the adjacent side of the groove at the periphery of the piston is substantially the same as the space indicated at 13 between the low pressure side of the ring and the adjacent side of the groove at the inner periphery of the ring. This illustrates a condition of balance between the pressures at the opposite sides of the ring with the ring located in the center of the groove axially. Under such conditions leakage will occur around the ring through the ring groove even though a tight seal is effected by the scraping edge of the ring contacting the cylinder as at 14.

In the right-hand view of Fig. 2, I have indicated the action of a ring embodying the features of the invention made according to the structure illustrated in Figs. 1, 3, 4 and 5. Thus, in Fig. 1 I show a cylinder 20 with a piston 21 operating therein. The piston is provided with a ring 22 which is illustrated diagrammatically in the right-hand view of Fig. 2 and more accurately in Figs. 3, 4 and 5. High pressure fluid is admitted to the upper end of the cylinder as by a port 19.

As heretofore stated, a piston and ring construction embodying the features of the invention is provided with passages to conduct the high pressure fluid to the inner part of the ring groove so that the fluid will not flow across high pressure side of the ring with a high velocity, but the pressure thereof will be maintained across substantially the entire area of this side of the ring. In the embodiment shown in these figures, such passages are provided by forming the upper or high pressure side of the ring with a plurality of scallops 23 which permits the passage of high pressure fluid from the clearance between the piston 21 and the cylinder wall 20 through the scallops to the inner portion of the ring groove, indicated at 24. This ring as heretofore stated is provided with a tapered outer face 25 which forms an upper scraping edge 26 engaging the cylinder wall at the high pressure side of the ring.

The right-hand view of Fig. 2 illustrates diagrammatically and in an exaggerated way, what happens to the ring when subjected to pressure. Thus, due to the inherent self-expansible nature of the ring and due to the fact that high pressure fluid is conducted to the inner portion 24 of the ring, the ring is forced outwardly into tight contact with the cylinder wall at the upper scraping edge 26 and, because of the fact that the scraping edge 26 is at one side of the ring, the ring twists or dishes as indicated diagrammatically in Fig. 2. If the extent of dishing is limited by the width of the groove, the upper or high pressure side of the ring contacts the corner of the groove formed by the upper side and the periphery of the piston as indicated at 30. Also the edge defined by the low pressure side of the ring and its inner periphery, as indicated at 31, will contact the low pressure side of the groove. However, since the scallops 23 permit passage of high pressure fluid over the top side of the ring to the inner part of the groove, while at the lower side of the ring, the pressure will be reduced because of the high increase in velocity of any fluid leaking past the ring at that point, there will be an unbalance of pressure with a higher pressure at the upper side of the ring than at the opposite side. Such higher pressure naturally forces the ring toward the opposite side of the groove and thus causes the lower edge 31 to form a highly effective seal with the adjacent side of the groove, the edge 26 of course forming a tight seal with the cylinder wall. A ring of this construction therefore is highly efficient in preventing leakage past the piston 21. While the amount of dishing and the angle of taper are exaggerated in the diagrammatic view shown at the right-hand of Fig. 2, the angle of taper is greater than the angle resulting from the dishing so that even after the ring is dished, the ring contacts the cylinder wall solely at the edge 26.

In the embodiment shown in Figs. 6 and 7 an ordinary taper face ring 35 is employed, but in this instance the upper side of the ring groove is provided with scallops 36 to conduct the high pressure fluid to the inner portion of the ring groove. The action of course will be exactly the same as discussed in connection with the first described form of ring, with the ring dishing as in the first case and a tight seal effected at the point 37 between the scraping edge of the ring and the cylinder wall and another tight seal effected at the point 38 between the edge defined by the lower or low pressure side of the ring and its inner periphery, contacting with the the lower side of the ring groove.

In Fig. 8 still another embodiment is shown in which the piston is provided with an ordinary ring groove, indicated at 40, and an ordinary taper ring indicated at 41. However, pressure fluid is conducted to the inner side of the ring groove by a passage 42 formed in the piston. In the present instance, the passage 42 is shown as extending from the head end of the piston although it may, of course, extend from the clearance between the piston and the cylinder wall above or at the high pressure side of the ring. In this form, since the inner part of the groove is subjected to high pressure fluid through the passage 42, a high pressure will be maintained against the entire upper face of the ring 41, while at the low pressure side of the ring, the pressure drops because of the increase in velocity. Consequently, with the dishing of the ring a highly effective seal is provided between the scraping edge of the ring, indicated at 43, in contact with the cylinder wall and also at the edge defined by the lower face of the ring and its inner periphery contacting the adjacent side of the ring groove as indicated at 44.

I claim:

1. The combination of a piston member adapted for operation in a cylinder containing fluid under higher pressure at one side of the piston than at the other, said piston member having a peripheral groove therein, and a self-expansible ring member mounted in said groove and having an outer face tapered in a direction away from the high pressure side of the ring member so that the latter contacts the cylinder solely along the edge formed by its outer face and its high pressure side, one of said members having passages extending from the high pressure side to the inner portion of the groove to conduct high pressure fluid to the inside of the ring member to force it outwardly into tight contact with the cylinder, the ring member being dished toward the low pressure side at its inner periphery by the expanding force because of the contact with the cylinder along said edge, the angle of taper of the outer face of the ring member being greater than the angle of dishing whereby the contact with the cylinder remains along said edge.

2. The combination of a piston member adapted for operation in a cylinder containing fluid under higher pressure at one side of the piston than at the other, said piston member having a peripheral groove therein, and a self-expansible ring member mounted in said groove and having an outer face tapered in a direction away from the high presusre side of the ring member so that the latter contacts the cylinder solely along the edge formed by its outer face and its high pressure side, one of said members having passages extending from the high pressure side to the inner portion of the groove to conduct high pressure fluid to the inside of the ring member to force it outwardly into tight contact with the cylinder, the ring member being dished toward the low pressure side at its inner periphery by the expanding force because of the contact with the cylinder along said edge, the width of the groove being greater than the thickness of the ring member to provide space for the dishing of the latter, the angle of dishing being less than the angle of taper of the outer face of the ring member so that contact of the latter with the cylinder remains along said edge, the ring member contacting the low pressure side of the groove along the edge formed by the low pressure side of the ring member and its inner periphery to form a seal along said last-mentioned edge.

3. The combination of a piston member adapted for operation in a cylinder containing fluid under higher pressure at one side of the piston than at the other, said piston member having a peripheral groove therein, and a self-expansible ring member mounted in said groove and having an outer face tapered in a direction away from the high pressure side of the ring member so that the latter contacts the cylinder solely along the edge formed by its outer face and its high pressure side, one of said members having passages extending from the high pressure side to the inner portion of the groove to conduct high pressure fluid to the inside of the ring member to force it outwardly into tight contact with the cylinder, the ring member being dished toward the low pressure side at its inner periphery by the expanding force because of the contact with the cylinder along said edge, the width of the groove being greater than the thickness of the ring member to provide space for the dishing of the latter, and the ring member contacting the high pressure side of the groove adjacent said edge and contacting the low pressure side of the groove along the edge formed by the low pressure side of the ring member and its inner periphery, whereby a seal is formed along said last-mentioned edge between the inner portion of the ring groove and the low pressure side.

4. The combination of a piston member adapted for operation in a cylinder containing fluid under higher pressure at one side of the piston than at the other, said piston member having a peripheral groove therein, and a ring member mounted in said groove and having its outer face tapered in a direction away from the high pressure side of the ring member and dished toward the low pressure side at its inner periphery when in operative engagement with the cylinder, one of said members having passages extending to the inner portion of the groove to conduct high pressure fluid thereto and thereby subject the high pressure side of the ring to high pressure to force the ring member toward the low pressure side of the groove so that the edge defined by the low pressure side of the ring member and its inner periphery forms a seal with the low pressure side of the groove.

5. The combination of a piston member adapted for operation in a cylinder containing fluid under higher pressure at one side of the piston than at the other, said piston member having a peripheral groove therein, and a ring member mounted in said groove and having its outer face tapered in a direction away from the high pressure side of the ring member and dished toward the low pressure side at its inner periphery when in operative engagement with the cylinder, said ring member having scallops on its high pressure side whereby the ring member is subjected to greater pressure on its high pressure side than on its low pressure side and the ring member is forced toward the lower pressure side of the groove and the edge defined by the low pressure side of the ring member and its inner periphery forms a seal with the low pressure side of the groove.

6. The combination of a piston member adapted for operation in a cylinder containing fluid under higher pressure at one side of the piston than at the other, said piston member having a peripheral groove therein, and a ring member mounted in said groove and having its outer face tapered in a direction away from the high pressure side of the ring member and dished toward the low pressure side at its inner periphery when in operative engagement with the cylinder, said piston having scallops on the high pressure side of the ring groove to subject the adjacent side of the ring member to high pressure to force the ring member toward the lower pressure side of the groove and the edge defined by the low pressure side of the ring member and its inner periphery forms a seal with the low pressure side of the groove.

7. The combination of a piston member adapted for operation in a cylinder containing fluid under higher pressure at one side of the piston than at the other, said piston member having a peripheral groove therein, and a ring member mounted in said groove and having its outer face tapered in a direction away from the high pressure side of the ring member and dished toward the low pressure side at its inner periphery when in operative engagement with the cylinder, said piston having one or more passages extending through the body of the piston from a portion of the piston subjected to high pressure to the inner portion of the ring groove to conduct high pressure fluid thereto and thereby subject the high pressure side of the ring member to high pressure at both the inner and outer peripheries of the ring member to force the latter toward the low pressure side of the groove and the edge defined by the low pressure side of the ring member and its inner periphery forms a seal with the low pressure side of the groove.

8. A piston ring adapted for operation in a ring groove in a piston cooperating with a cylinder containing fluid under higher pressure at one side of the piston than at the other, said ring comprising a metal member generally rectangular in cross section but having a tapered outer face providing a scraping edge at one side of the ring, said ring having scallops on said one side extending radially through the width of the ring.

MELVIN E. ESTEY.

References Cited in the file of this patent

UNITED STATES PATENTS

| Number | Name | Date |
| --- | --- | --- |
| 1,327,801 | Blache | Jan. 13, 1920 |
| 1,919,183 | Paton | July 18, 1933 |
| 2,213,452 | Paton | Sept. 3, 1940 |

FOREIGN PATENTS

| Number | Country | Date |
| --- | --- | --- |
| 439,353 | Great Britain | Dec. 5, 1935 |
| 713,067 | France | Aug. 10, 1931 |
| 907,416 | France | June 25, 1945 |